Figure 1:
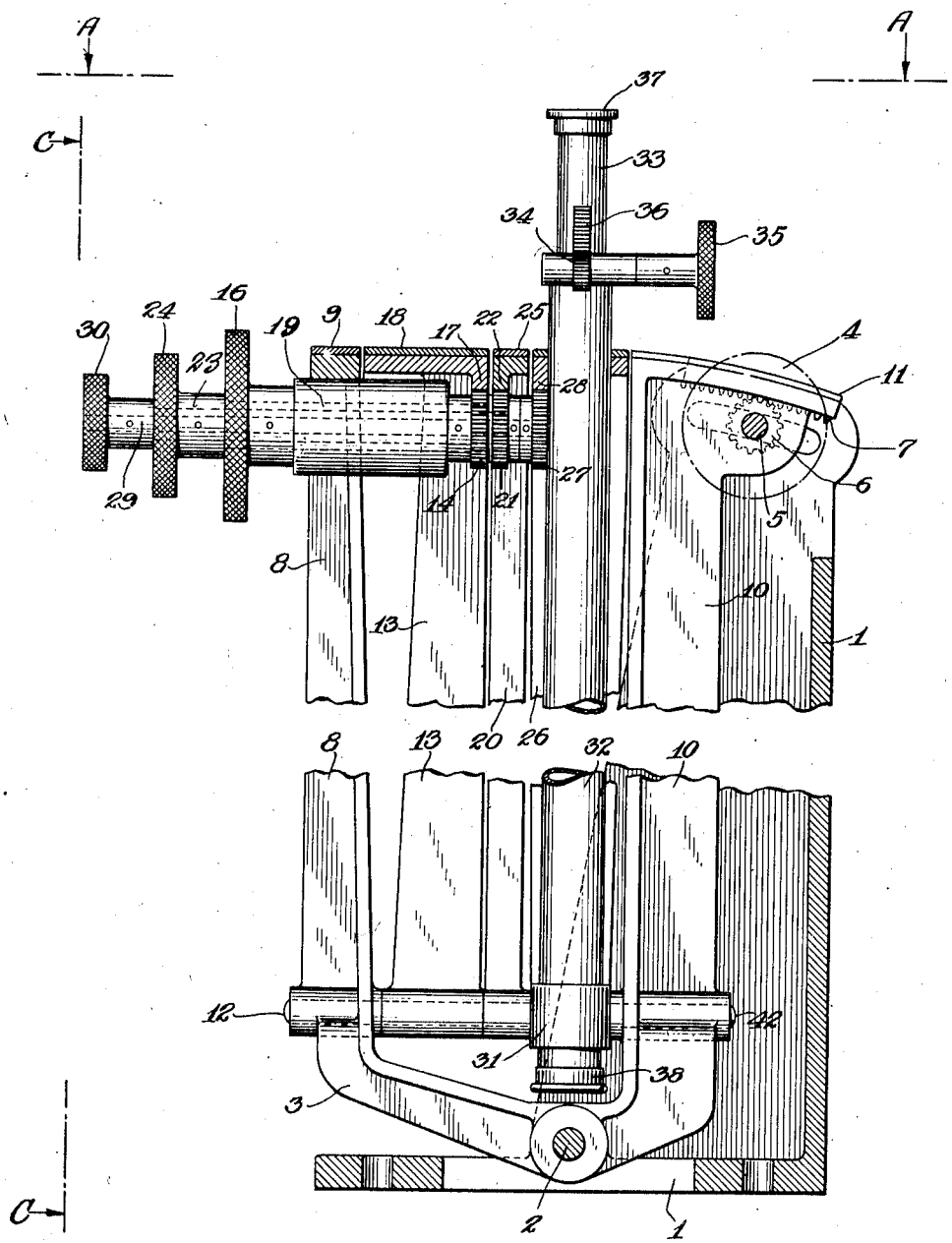

P. GERLI AND O. A. ROSS.
RANGE FINDING AND SIGHTING INSTRUMENT.
APPLICATION FILED MAR. 9, 1918.

1,339,450.

Patented May 11, 1920.
4 SHEETS—SHEET 4.

Inventors
Paul Gerli and Oscar A. Ross.
By their Attorneys

UNITED STATES PATENT OFFICE.

PAUL GERLI AND OSCAR A. ROSS, OF NEW YORK, N. Y.

RANGE-FINDING AND SIGHTING INSTRUMENT.

1,339,450.  Specification of Letters Patent.  Patented May 11, 1920.

Application filed March 9, 1918. Serial No. 221,497.

*To all whom it may concern:*

Be it known that we, PAUL GERLI and OSCAR A. Ross, citizens of the United States, and residents of New York city, in the county of New York and State of New York, have invented certain new and useful Improvements in Range-Finding and Sighting Instruments, of which the following is a specification.

Our improvement pertains particularly to telescope sighting instruments with range correction therefor for use in connection with "bombing aeroplanes" and has for its more prominent object the construction of a device whereby aerial torpedoes, or bombs, can be accurately dropped from said aeroplanes whereby said torpedoes, or bombs, will fall on or strike the object aimed at.

A further object is to furnish a sighting instrument which permits compensation for the speed of the said bombing aeroplanes, their altitude, the velocity of head-on, or rear wind, the velocity of cross, or athwartship winds and the inertia of the torpedoes, or bombs, to be dropped, due to the speed of said "bombing aeroplanes".

A further object is to furnish means whereby the observer or person sighting is enabled to determine the angle of correction whereby he may instruct the pilot of the proper course to pursue to the attainment that a torpedo, or bomb, may be accurately dropped to fall on the object at which it is aimed.

A further object is to furnish a novel arrangement for storing and dropping the torpedoes, or bombs.

Figure 2:
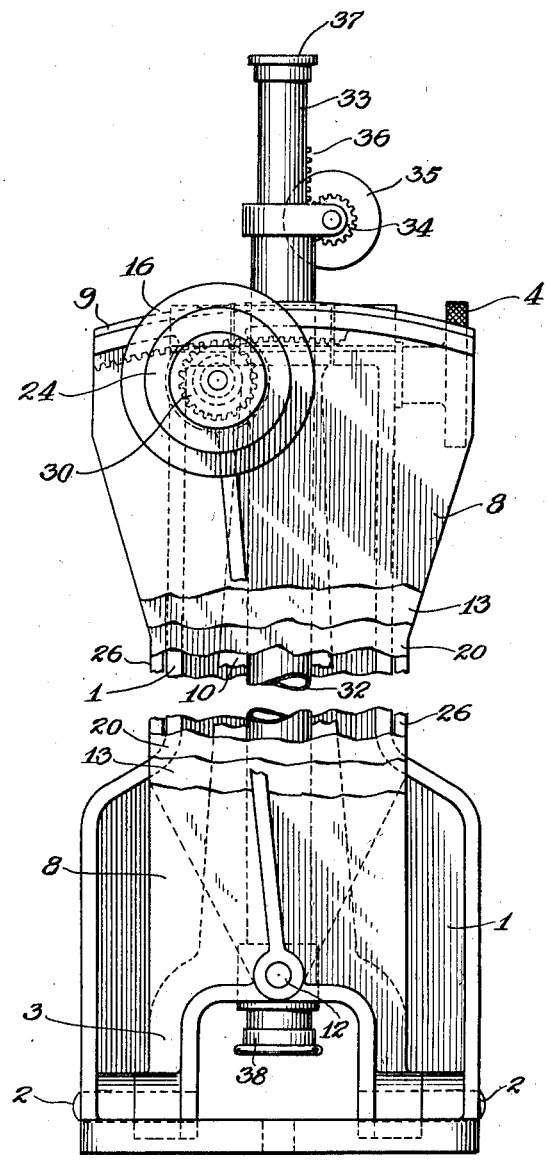
Figure 3:
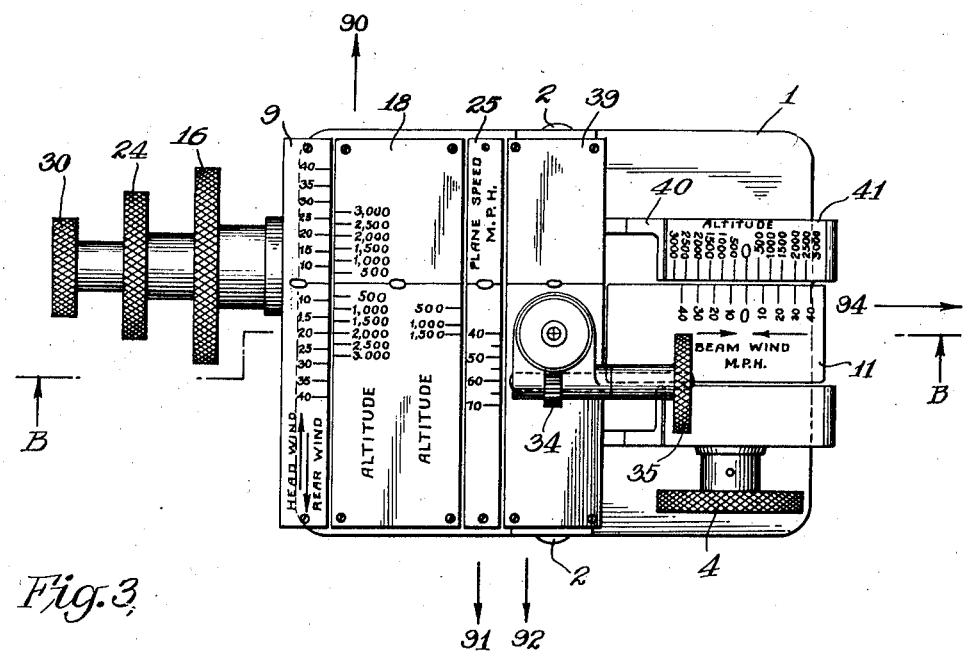
Figure 4:
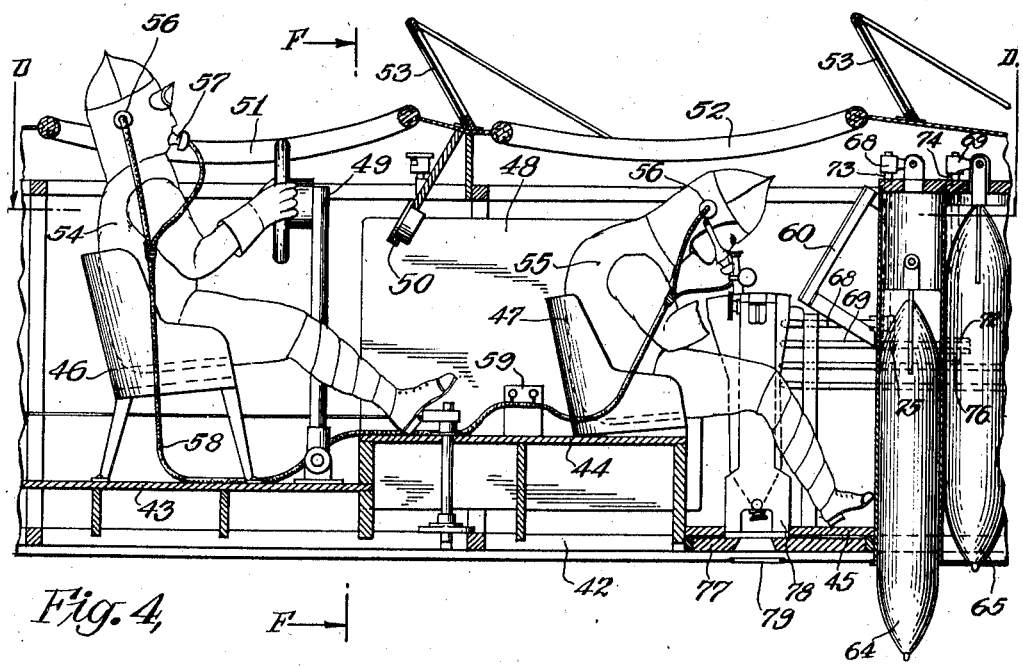
Figure 5:
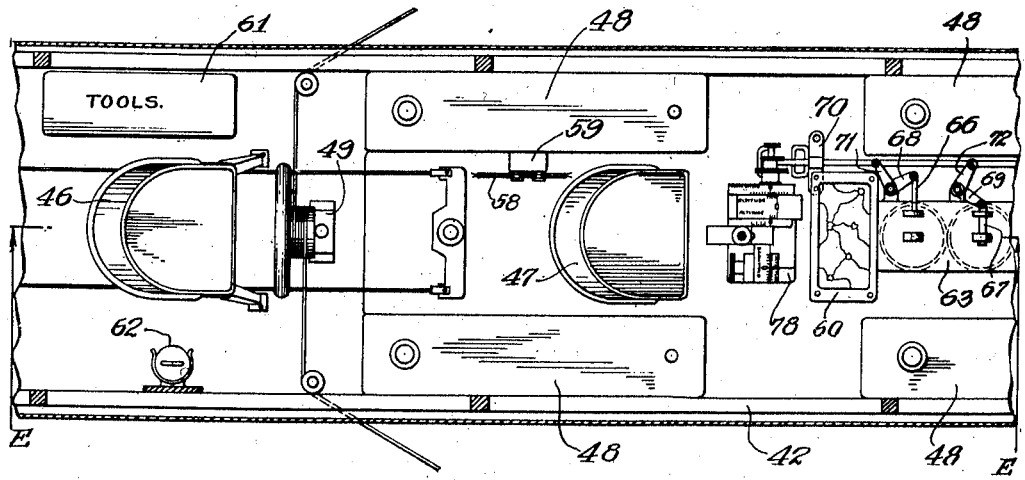

Other objects sought and attained will be apparent as the description of our preferred form of instrument and apparatus associated therewith progresses, and as disclosed in the accompanying drawing in which like reference numerals in each figure refer to like parts, and in which:

Figure 1, is a sectional view of one embodiment of our invention taken on line B—B of Fig. 3, and, Fig. 2, is a plan view of the same device taken on line C—C of Fig. 1, and, Fig. 3, is a plan view taken on line A—A, of Fig. 1, and, Fig. 4, is a sectional view of a portion of a bombing aeroplane illustrating the application of our improvement to such a machine, and is taken on line E—E of Fig. 5, and, Fig. 5, is a part section, part plan view of the same machine taken on line D—D, of Fig. 4, the pilot and observer being absent, and, Fig. 6, is a sectional view of the same machine taken on line F—F, of Fig. 4, illustrating principally the instrument board, and, Fig. 7, represents a view as appearing to the observer when sighting through the telescope of our improved instrument.

In order that a clear understanding of the preferred form of our improved instrument may be obtained, a brief preliminary description of the parts associated therewith may be apposite.

Pivoted to frame 1, by pins 2, is bracket 3, the movement of which is controlled by thumb screw 4, mounted on shaft 5, having gears 6—6, meshing with racks 7—7, secured to frame 1. At the upper extremity of extension 8, on bracket 3, is dial card 9, showing adjustment to be made for any head-on, or rear wind which may exist. On the upper extension 10, of said bracket 3, is dial card 11, indicating adjustment to be made for any cross, or athwartship winds which may exist at the time of dropping the torpedo, or bomb.

Pivoted on bracket 3, by pin 12, is quadrant 13, the movement of which is controlled by gear 14, secured to sleeve 15, actuated by thumb screw 16, said gear meshing with rack 17. On the upper end of quadrant 13, is dial card 18, having graduations adapted to coöperate with those on adjacent quadrants as will be more fully hereinafter described. Sleeve 15, is supported in boss 19, secured to extension 8, of bracket 3. Also pivoted on bracket 3, by pin 12, is quadrant 20, the movement of which is controlled by gear 21, meshing with rack 22, and mounted on sleeve 23, to which thumb screw 24, is secured. Mounted on said quadrant is dial card 25, having graduations indicating the speed of the aeroplane to which our improved sighting instrument may be attached.

Also pivoted on bracket 3, by pins 12 and 42, is quadrant 26, the movement of which is controlled by gear 27, meshing with rack 28, and mounted on shaft 29, to which is secured thumb screw 30. Secured to said quadrant 26, is sighting telescope 31, having stationary barrel 32 and movable barrel 33, actuated by gear 34, controlled by thumb screw 35, and meshing with rack 36.

A telescope for gun sighting purposes is of well known construction and is the type we employ in our improved instrument with such modification as hereinafter described. It is sufficient to state that the movable barrel 33, has the upper lens housing 37, and intermediate optics not shown, and that the fixed barrel 32, has the lower lens housing 38, containing the lens engraved with hair lines and circumferential graduations as shown in Fig. 7.

Also mounted on quadrant 26, is the dial card 39, on which the zero line is engraved.

Mounted on the extension 40, of frame 1, is the dial card 41, having graduations adapted to coöperate with those on dial 11, as will be more fully hereinafter described.

Referring to Figs. 4, 5 and 6, representing a portion of the body of a bombing aeroplane to which our improved instrument is attached, 42 is the body frame having the respective floors 43, 44, and 45, 46 is the pilot seat, 47 is the observer seat, 48—48 the gasolene tanks, 49 the control column, 50 the instrument board, 51 the pilot's cockpit, 52 the observer's cockpit, 53—53 the wind shields, 60 the map board, 61, the tool box, 62 the fire extinguisher, 54 the pilot and 55 the observer.

The pilot and observer are in telephonic communication by means of receivers 56, and transmitters 57, attached to cable 58, connected to battery 59.

Attached to body frame 42, is the torpedo housing 63, containing torpedoes 64 and 65, said torpedoes being normally supported by pins 66 and 67, connected to levers 68 and 69, mounted on shafts 73 and 74. Operating rods 68 and 69, supported by bracket 70, and connected to levers 71 and 72, mounted on shafts 73 and 74, supported in bearings 75 and 76, are adapted to withdraw pins 66 and 67, rod 68 being shown in such withdrawn position with the torpedo 64, about to discharge from its chamber.

Mounted on extension 77, of the torpedo housing 63, is our improved sighting and range finding instrument 78, adapted to have vision through opening 79.

Instrument board 50, is supplied with the usual altitude meter 80, vertical compass 81, speedometer 82, a chronometer, gages 84 and 85, gradometer 86, which indicates the fore and aft plane in which the aeroplane is traveling and, the bankometer 87 which indicates the athwartship plane in which said aeroplane is traveling, or in other words, said last named instrument indicates the angle at which the athwartship axis is traveling with respect to an axis perpendicular to a plane established by gravitation.

The operation of our improved sighting and range finding instrument is as follows: With the quadrants 18, 25, 39 and 11 in the zero position, as shown in Fig. 3, flight is made and a given land mark, shown by the map on map board 60, is spotted through the telescope, and as the sighting center Z, of the telescope, shown in Fig. 7, passes said land mark, a notation of time is made. As the next land mark on said map is noted, the definite distance of which is known, the elapsed time between the two said land marks is noted, thereby indicating the miles per hour in traveling between said land marks. By deduction from the miles per hour as indicated by speedometer 82, the amount of head, or rear wind, is determined. By making a subsequent flight at right angles to the one as hereinbefore described, the amount of cross wind can be determined in the same manner.

There are other well known means for determining the amount of head-on, or rear, and cross winds, the foregoing being stated as one well adapted for obtaining the results sought. These tests for determining the amount of head, or rear and cross winds, are preferably made just prior to, and in the vicinity of territory where a bombing raid is to be made.

Assume for example that the aeroplane to which our improved instrument is attached has determined that a head wind of ten miles per hour exists, and that said aeroplane is traveling at an altitude of 1500 feet, and at 70 miles per hour. Also that no cross wind exists. The observer 55, therefore, moves quadrant 13, forward, in direction of arrow 90, by means of thumb screw 16, until the altitude graduation "1500" on dial 8, registers with the miles per hour "10" on dial 9. Thereafter, quadrant 20, is moved by means of thumb screw 24 in direction of arrow 91, until its zero line on dial 25, registers with the graduation of altitude "1500," on dial 18. Thereafter, quadrant 26, is moved in the direction of arrow 92, until the zero line on dial 39, registers with the "M. P. H." graduation "70," on dial 25.

After these adjustments are made the observer orders the pilot to hold the observed speed and altitude constant. Also to hold the aeroplane in a true horizontal plane, both with respect to its fore and aft axis, and its athwartship axis, the aeroplane of course being headed for the object to be bombed. The observer now sights through the telescope by placing his eye over the lens housing 37, and assuming the course to be accurate the object to be bombed, as for example, a factory shown by numeral 93, of Fig. 7, will appear on hair line 89. Assume that, if in place of appearing on line 89, said factory had appeared substantially on line X—X of Fig. 7, the observer would notify the pilot to correct the course 15° to the starboard, and, as the line 89, appeared over the center of said factory building 93, the observer would order the pilot to observe readings on the compass and hold to such a course.

As the aeroplane moves forward the hair line 88, will approach the factory 93, and, as the intersection Z, of lines 88 and 89, appear directly over the center of said factory, the observer 55, would actuate one or more of the rods, as 68 and 69, thereby releasing one or more of torpedoes, or bombs, as 64 and 65, which accurately fall on and explode, thereby destroying said factory building.

If it had been found that the composite wind also indicated a cross wind of 10 miles per hour from the starboard in addition to the head wind, as hereinbefore described, the entire bracket 3, would have been moved around pins 2, by means of thumb screw 4, in the direction of arrow 94, until the "M. P. H." graduation "10" on dial 11, registers with the altitude graduation "1500" on dial 41, in this manner giving a sighting range which compensates for the displacement of a falling torpedo by such cross wind.

It will be noted from the foregoing description that we have furnished means whereby it can be accurately determined at just what point a torpedo, or bomb, must be dropped from a moving aeroplane to fall on the object to be destroyed, said means taking into consideration all the elements which would tend to move said torpedo, or bomb, from its path as would be established by the action of gravity alone.

It will be noted that the graduations to compensate for inertia at various altitudes and appearing on the right hand edge of dial card 18, terminate at altitude 1500, it being found that at the usual maximum speed of bombing machines, namely, 70 miles per hour, the effect of the inertia of a torpedo after being dropped by the aeroplane, becomes practically *nil* after falling a distance of 1500 feet. It is obvious that if higher speeds of bombing machines are employed, that further graduations for additional effect of inertia can be added.

It will be obvious that various modifications of our invention can be made, therefore, we do not wish to limit ourselves to the exact construction herein shown and described, but reserve to ourselves the right to all modifications as properly fall within the sphere and scope of our invention.

What we claim is:—

1. A sighting instrument for bombing aeroplanes comprising in combination a frame pivotally mounted on the aeroplane, a plurality of quadrants pivoted to said frame, thumb screws and gears engaging therewith for laterally adjusting the same, a telescope carried by one quadrant, and dial cards having zero lines and figures representing altitude, speed, windage and other data respectively carried by the other quadrants.

2. A sighting instrument for bombing aeroplanes comprising in combination a frame pivotally mounted on the aeroplane, a gear and thumb screw for adjusting the same forward and back in a vertical plane, a plurality of quadrants pivoted to the frame and means for independently adjusting the same laterally about their pivotal supports, a telescope carried by one quadrant, and dial cards with normally registering zero lines and figures representing head and rear winds, altitude and speed respectively carried by the other quadrants.

3. A sighting instrument for bombing aeroplanes, comprising in combination a frame pivoted to a stationary part of the aeroplane and adjustable back and forth in a vertical plane, a plurality of quadrants pivoted to the frame with the capability of lateral adjustment, dial cards with zero lines and figures indicating head and rear winds, altitude and speed respectively carried by the quadrants, a telescope supported by one of the quadrants, and an adjustable dial card with figures indicating beam winds.

4. The combination with the frame pivoted with the capability of adjustment forward and back in a vertical plane, a series of quadrants provided with racks and pivoted to said frame with the capability of lateral adjustment about their pivotal supports, a vertical telescope carried by one quadrant, a series of dial cards carried by the other quadrants with normally registering zero lines and figures indicating windage, altitude, and speed respectively, and thumb screws and gears engaging with racks on the quadrants for independently adjusting the same.

Signed at New York city, in the county of New York and State of New York, this sixth day of March, A. D. 1918.

PAUL GERLI.
OSCAR A. ROSS.